(12) United States Patent
Adur

(10) Patent No.: US 10,435,559 B2
(45) Date of Patent: *Oct. 8, 2019

(54) IMPACT-MODIFIED POLYAMIDE COMPOSITIONS

(71) Applicant: VERTELLUS HOLDINGS LLC, Indianapolis, IN (US)

(72) Inventor: Ashok M. Adur, Parsippany, NJ (US)

(73) Assignee: Vertellus Holdings LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,196

(22) Filed: Jun. 8, 2018

(65) Prior Publication Data

US 2018/0291203 A1    Oct. 11, 2018

Related U.S. Application Data

(63) Continuation of application No. 14/776,293, filed as application No. PCT/US2014/027451 on Mar. 14, 2014, now Pat. No. 10,011,718.

(60) Provisional application No. 61/788,900, filed on Mar. 15, 2013.

(51) Int. Cl.
| | | |
|---|---|---|
| C08L 77/02 | (2006.01) |
| C08L 77/06 | (2006.01) |
| C08K 7/14 | (2006.01) |
| C08L 23/02 | (2006.01) |
| C08L 23/08 | (2006.01) |
| C08L 51/04 | (2006.01) |
| C08L 51/06 | (2006.01) |

(52) U.S. Cl.
CPC .............. *C08L 77/02* (2013.01); *C08K 7/14* (2013.01); *C08L 23/025* (2013.01); *C08L 23/0869* (2013.01); *C08L 51/04* (2013.01); *C08L 51/06* (2013.01); *C08L 77/06* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 3,388,186 A | 6/1968 | Kray |
| 3,465,059 A | 9/1969 | Seven |
| 3,516,961 A | 6/1970 | Robb |
| 3,668,274 A | 6/1972 | Owens |
| 3,673,277 A | 6/1972 | Schmitt et al. |
| 3,845,163 A | 10/1974 | Murch |
| 4,174,358 A | 11/1979 | Epstein |
| 4,351,931 A | 9/1982 | Armitage |
| 4,448,956 A | 5/1984 | Lenke et al. |
| 4,594,386 A | 6/1986 | Olivier |
| 4,966,941 A * | 10/1990 | Subramanian .......... C08L 77/00 525/179 |
| 5,112,908 A | 5/1992 | Epstein et al. |
| 5,122,570 A * | 6/1992 | Subramanian .......... C08L 77/00 525/179 |
| 5,244,971 A | 9/1993 | Jean-Marc |
| 5,346,963 A | 9/1994 | Hughes |
| 5,482,997 A | 1/1996 | Debets et al. |
| 5,889,112 A | 3/1999 | Shih et al. |
| 6,008,297 A | 12/1999 | Tanaka |
| 6,241,972 B1 * | 6/2001 | Herms ..................... A61K 8/25 424/401 |
| 6,759,474 B1 | 7/2004 | Keener et al. |
| 7,151,136 B2 | 12/2006 | Montanari et al. |
| 7,671,127 B2 | 3/2010 | Weber et al. |
| 9,353,262 B2 * | 5/2016 | Tarbit ..................... C08L 77/02 |
| 10,011,718 B2 * | 7/2018 | Adur ..................... C08L 77/06 |
| 2001/0049424 A1 | 12/2001 | Petiniot et al. |
| 2004/0013833 A1 | 1/2004 | Lee et al. |
| 2006/0148988 A1 | 7/2006 | Chou |
| 2007/0154697 A1 | 7/2007 | Cossement et al. |
| 2009/0227739 A1 | 9/2009 | Chou |
| 2010/0311958 A1 | 12/2010 | Nishibu et al. |
| 2011/0206881 A1 | 8/2011 | Briffaud et al. |
| 2011/0207838 A1 | 8/2011 | Lima |
| 2011/0306701 A1 | 12/2011 | Weber et al. |
| 2013/0150517 A1 | 6/2013 | Tarbit et al. |
| 2016/0046807 A1 | 2/2016 | Adur |

FOREIGN PATENT DOCUMENTS

| | | |
|---|---|---|
| CN | 101230193 | 7/2008 |
| DE | 4223864 | 1/1994 |
| EP | 0232878 | 8/1987 |
| EP | 0234819 | 9/1987 |
| EP | 0377511 | 7/1990 |
| EP | 0284379 | 12/1992 |
| EP | 0693532 | 1/1996 |
| EP | 0495363 | 7/1999 |
| JP | 62-250053 | 10/1987 |
| JP | 2011179005 | 9/2011 |
| WO | 90/07556 | 7/1990 |
| WO | 199007555 | 7/1990 |
| WO | 1993/06174 | 4/1993 |
| WO | 99/07769 | 4/1999 |
| WO | 03/099930 | 12/2003 |
| WO | 2006034388 | 3/2006 |
| WO | 2008140196 | 11/2008 |
| WO | 2010015785 | 2/2010 |

(Continued)

OTHER PUBLICATIONS

PCT International Search Report and Written Opinion for PCT/US2014/027451, dated Jul. 30, 2014, 11 pages.

(Continued)

*Primary Examiner* — Ana L. Woodward
(74) *Attorney, Agent, or Firm* — Barnes & Thornburg, LLP

(57) ABSTRACT

Described herein are polyamide compositions and processes for producing polyamide compositions, comprising: (i) a polyamide, (ii) an olefin-maleic anhydride copolymer (on its own or in a master batch form), and (iii) an impact modifier (or an elastomeric polymer with an optional compatibilizer), which exhibit enhanced ambient and low temperature impact strength complimented by excellent thermal, tensile and flexural properties.

20 Claims, No Drawings

(56) References Cited

FOREIGN PATENT DOCUMENTS

| WO | 2012/024268 | 2/2012 |
| WO | 2014008330 | 1/2014 |
| WO | 2014018738 | 1/2014 |
| WO | 2014/152538 | 9/2014 |
| WO | 2014152538 | 9/2014 |

OTHER PUBLICATIONS

Vertellus Company Introduction, George Jong, 2011, Obtained at http://www.adhesive-lin.com/system_dntb/upload/11011113112841435.pdf.
Zemac Copolymers Product Information. Obtained Dec. 30, 2014 at http://www.vertellus.com/products/plastics-polymers/zemac-copolymers.
PCT International Search Report and Written Opinion for PCT/US2014/027451, completed by the US Searching Authority on Jun. 30, 2014.
PCT Search Report and Written Opinion for PCT/US2011/047872, completed Jan. 5, 2012.
PCT International Search Report and Written Opinion for PCT/US2013/049201 completed by the US Searching Authority on Dec. 3, 2013.
DWPI Patent Record for EP0693532.
Extended European Search Report for EP11818646.9 completed on Apr. 4, 2014.
Extended European Search Report, dated Mar. 22, 2016, pp. 1-5, European Patent Office. Germany.
S Malhotra et al: "Modified Maleic Anhydride Copolymers As E-Beam Resists", Mar. 8, 1990, San Jose, XP055287619, (http://www.dtic.mil/dtic/tr/fulltext/u2/a218470.pdf).

* cited by examiner

IMPACT-MODIFIED POLYAMIDE COMPOSITIONS

CROSS REFERENCE TO RELATED APPLICATIONS

This application is a continuation of U.S. patent application Ser. No. 14/776,293, filed Sep. 14, 2015, now U.S. Pat. No. 10,011,718, issued Jul. 3, 2018, which is a U.S. national stage application under 35 U.S.C. § 371(b) of International Application No. PCT/US2014/027451 filed Mar. 14, 2014, and claims the benefit under 35 U.S.C. § 119(e) of U.S. Provisional Patent Application No. 61/788,900, filed on Mar. 15, 2013. The entirety of the contents of each of which are herein incorporated by reference.

BACKGROUND

Polyamide (nylon) thermoplastic resins offer an excellent balance of processability and performance properties and therefore are used widely. Of the many types of nylon available, the most common are Polyamide-6 and Polyamide-6, 6. However, some end-use applications for these resins require improved impact performance at ambient or low temperatures. For these applications, polyamide is usually toughened by impact modifiers also called "tougheners". Polymer toughness, in the form of impact strength or resistance, is a measure of the ability of a material or processed article to withstand the application of a sudden load without "failure".

Illustrative polyamide impact modifiers that can be used for this purpose are grafted-maleic anhydride elastomers or terpolymers where the level of maleic anhydride is usually less than 5% and typically in the range of 0.8 to 2%. Examples from the class of maleic-anhydride grafted elastomers are thermoplastic olefins (TPO) also called reactor TPOs, rubber copolymers produced in a reactor from ethylene and propylene (EPR), or rubber terpolymers of ethylene, propylene and diene-modifier (EPDM), plastomers of ethylene with an alpha-olefin, etc., all grafted with maleic anhydride off-line and random terpolymers of ethylene, acrylic ester and maleic anhydride with typical maleic anhydride contents in the range of 1-5%. In the case of EPDM, typically dienes currently used in the manufacture of EPDM rubbers are dicyclopentadiene (DCPD), ethylidene norbornene (ENB), and vinyl norbornene (VNB) used at a 1-12% level. Other examples include maleic-anhydride grafted olefinic thermoplastic elastomers (TPE) produced from copolymers of monomers like butadiene, isoprene, propylene, ethylene, butene and octene, which behave like elastomers in performance but process like thermoplastics. Styrenic type modifiers such as linear tri-block copolymer of styrene, ethylene and butylene with grafted maleic-anhydride groups are also sometimes used. Another example of an impact modifier is a terpolymer like an ethylene-acrylate ester-maleic anhydride terpolymer, where the acrylate ester is a methyl, propyl, butyl and other acrylate esters. It is well known to one skilled in the art that these elastomeric materials without the compatibilizing functional maleic anhydride group are not able to provide impact strength improvement to the compound, because in such a case the nylon and the elastomeric phase in the toughener have limited or no interaction and stress cannot be transferred from the rigid polyamide phase to the elastomeric phase which can withstand the impact energy. The use of these maleic-grafted elastomers to impart impact resistance to polyamides has been in commercial use for several decades and has been previously described in U.S. Pat. Nos. 4,174,358 and 4,594,386. Other impact modifiers used are the acrylic core-shell type such as the Paraloid® product line from The Dow Chemical Company. Grades that work well for polyamides are the polymers or copolymers with maleic anhydride pendant groups or with isocyanate groups. Occasionally ionomers such as Surlyn are also used as impact modifiers in polyamides but only for end use applications where low temperature impact is not required. Compatibilizers (i.e. polymers or copolymers that, when added to an immiscible polymer blend, modify the blend's interfacial character and stabilizes its morphology) can be added with elastomeric materials that do not include compatibilizing functional groups.

Addition of a "good" toughener results in "no break" of the test sample during the notched Izod impact strength with typical values greater than 800 J/m (15 ft-lb/in.) at room temperature when used at levels between 15-25 weight %. The impact strength measured by the notched Izod method or by Charpy impact method depends on testing temperature. Use of a nylon modifier may provide high values of toughness at room temperature, yet only achieve a lower level of toughness below or at −30° C. Typically, the stiffness, thermal properties like softening point and heat deflection temperature (HDT) of a toughened polyamide decrease as more toughener is added with significant decreases in properties, e.g. flex modulus and tensile strength. Also the more elastomeric or its lower the glass transition temperature ($T_g$) the underlying impact modifier the better is its impact strength at low temperature. The same trend in physical properties is observed when the polyamide being toughened is reinforced with reinforcements like glass fibers, wollastonite or talc mineral fillers and/or flame retardants to form polyamide composites.

It is commonly accepted in the plastics compounding industry that when these impact modifiers are compounded into polyamides, there are negative effects on other properties such as tensile strength, tensile modulus, flexural modulus and strength as well as thermal properties such as heat deflection temperature (HDT) and softening point. However from an end user perspective, there remains a need for polyamide compounds with material compositions which mitigate these negative effects. There is a need in the marketplace for compositions which yield high values of impact performance of the polyamide compound without causing significant decrease in its other mechanical properties (i.e. retaining or even improving the impact properties of parts produced from such modified polyamide compounds and molded or extruded articles produced from those compositions).

SUMMARY

Described herein are polyamide compositions that comprise:
 a. a polyamide,
 b. an olefin-maleic anhydride copolymer (may be added directly or in the form of a master batch formulation), and
 c. an impact modifier (or an elastomeric polymer with an optional compatibilizer).

Also described herein is compounding the polyamide composition at its processing temperature in a compounding extruder to produce impact modified polyamide with high values of impact strength at room temperature and low temperature. The polyamide compositions described herein have surprisingly improved mechanical properties compared to polyamide compositions prepared using the impact modifier alone.

DETAILED DESCRIPTION

The terms "elastomeric material" and "elastomer" will be used interchangeably herein and generally refer to polymeric materials which exhibit typical elastomeric properties (tensile elongation greater than about 200%, Izod impact strength showing no break, crystallinity below about 3%, and a glass transition temperature below 0° C.,). Illustrative polymers for use as the elastomer include, but are not limited to ethylene-acrylate ester copolymers (e.g. copolymers of ethylene and n-butyl acrylate, methyl acrylate, or ethyl acrylate, and the like) where the co-monomers content is greater than 18%, thermoplastic olefins (TPOs), and thermoplastic elastomers (TPEs). Examples of TPOs and TPEs include plastomers, flexomers, ethylene-propylene copolymer rubber (EPR), ethylene-propylene-diene terpolymer rubber (EPDM), styrene-butadiene rubber (SBR), hydrogenated styrene-butadiene copolymers called styrene-ethylene-butene-styrene block copolymers (SEBS), ethylene-octene copolymers, ethylene-hexene copolymers, ethylene-4 methyl pentene-1 copolymers, and ethylene-butene copolymers with specific gravity below 0.900 g/ml, and the like. Selection of grades with lower molecular weight and higher melt index may result in minimizing high torque conditions during processing and/or provide a wider process window.

The optional compatibilizer can be selected from olefinic semi-crystalline thermoplastics like polyethylene and polypropylene with a grafted functional group selected from one of the following: anhydride, acid chloride, carboxylic acid, isocyanate, and other reactive groups. Examples of such polymers are Polybond® 1001 and 3200 from Addivant, Nucrel® and Fusabond® from DuPont, Amplify® and Primacor® from The Dow Chemical Co., Exxelor® from Exxon Mobil Chemicals, and the like.

It is described herein that either an elastomer with a compatibilizer can be used or a traditional impact modifier can be used as the third component (c).

Described herein is the surprising discovery that polyamide compositions with high values of impact strength can be produced with improvements in other mechanical properties such as tensile strength, HDT and flexural modulus by adding an olefin-maleic anhydride copolymer to the composition. In contrast to the worsening of those other mechanical properties that is normally associated with addition of an impact modifier alone.

The use of olefin-maleic anhydride copolymers, which are highly reactive additives, to form polymer formulations with polyamides having improved tensile strength, impact strength and other mechanical properties have been previously described in PCT International Publication No. WO 2012/024268A1 and in corresponding U.S. Patent Publication 2013/0150517. Described herein are polyamide compositions, and processes for preparing them, where the combination of the polyamide, impact modifier and the olefin-maleic anhydride copolymers, surprisingly results in mitigation of the expected negative effect of including the impact modifier in polyamide composition, thereby providing compositions with an overall desirable combination of mechanical properties such as tensile strength, tensile modulus, tensile elongation, flexural modulus, flexural strength, heat distortion temperature (HDT), softening point, as well as impact strength at room and low temperature.

In another embodiment, the olefin-maleic anhydride copolymer can be pre-mixed with a carrier resin to form a master batch which can be added to the polyamide, as described in PCT International Publication No. WO 2014/008330 A2.

Described herein are polymer formulations comprising polyamides compounded with one or more elastomers or tougheners and olefin-maleic anhydride copolymers. It is appreciated that the compositions may be prepared by combining all of the components in a single step or by combining the olefin-maleic anhydride copolymer in a master batch followed by combining the polyamide with the master batch. Some desirable characteristics of the master batch approach include: improved uniformity of the incorporation of the olefin-maleic anhydride copolymer additive in the final composition and reduction of the processing torque of the final polymer composition during processing. Desirable characteristics of the carrier resin used to form the master batch include: the carrier resin does not react with the additives, the additives do not phase separate from the carrier resin, the carrier resin does not phase separate with the polymer being formulated, the carrier resin of the master batch remains thermally stable at the processing temperatures and under the processing conditions typically used for processing polyamides, and the overall composition should be useful in improving impact and stiffness of the polyamide. In another embodiment, the polyamide composition is formed by compounding the olefin-maleic anhydride copolymer/elastomer master batch, which is prepared by combining the olefin-maleic anhydride copolymer with elastomers, with the polyamide or nylon and optionally another elastomer and/or a compatibilizer.

Illustrative embodiments described herein include use of processing methods such as extrusion compounding using equipment known to one skilled in the art. In the plastics industry, compounding is a process that mixes one or more polymers with one or more additives to produce plastic compounds in one or more steps. The feeds may be pellets, powder and/or liquids, but the product is usually in pellet form, to be used in other plastic-forming processes such as extrusion and injection molding.

Other illustrative embodiments of the methods described herein include directly extruding the compounding mixture into a finished article such as a filament, fiber, film, sheet, and molded part. It is to be understood that the compounding step may include a reaction between one or more of the components of the mixture.

In any of the methods or compositions described herein, other additives may be used depending upon the end use application. Such additives include one or more anti-oxidants, UV stabilizers, or UV absorbents, halogenated or non-halogenated flame retardant additives, reinforcements such a mineral or fibers, fabrics, roving filaments, tubes and yarns, made from glass, carbon, graphite, cellulose and other natural materials; and/or aromatic high melting polymers (sometimes referred to as aramids) are included. Plasticizers, lubricants, rheology modifiers, friction modifiers, and other additives known to one skilled in the art may also be optionally added. Illustrative additives include colorants, heat stabilizers, light stabilizers, polymerization regulators, plasticizers, lubricants, rheology modifiers, flame retardants, reinforcing agents, friction modifiers, anti-blocking agents, antioxidants, antistatic agents, pigments, dyes, fillers or mixtures thereof.

The olefin-maleic anhydride copolymer used in the compositions described herein is not a grafted copolymer with one or two maleic anhydride groups per molecular chain, but a true copolymer with multiple maleic anhydride groups on the main chain of the polymer. In one embodiment, the olefin-maleic anhydride copolymer is an alternating copolymer of the olefin and maleic anhydride. In any of the methods or compositions described herein the olefin can be selected from ethylene, propylene, isobutylene, 1-butene, 1-octene, butadiene, styrene, isoprene, styrene, 1-hexene, 1-dodecene, 1-tetradecene and other alkenes. Other copolymers like methyl and butyl acrylate can also be used with the maleic anhydride.

In any of the methods or compositions described herein, the olefin-maleic anhydride can be an ethylene maleic anhydride alternating copolymer (EMA) with a molar ratio of ethylene to maleic anhydride of about 1:1. In any of the methods or compositions described herein, the olefin-maleic anhydride can be an ethylene maleic anhydride alternating copolymer (EMA) with a molar ratio of ethylene to maleic anhydride of about 1:99 to about 99:1. In any of the methods or compositions described herein, the olefin-maleic anhydride copolymer can be a non-alternating copolymer or a random copolymer with a molar ratio of ethylene to maleic anhydride range of about 1:50 to about 50:1; about 1:20 to about 20:1; about 1:10 to about 10:1; about 1:5 to about 5:1; and about 1:2 to about 2:1.

In any of the methods or compositions described herein, the olefin-maleic anhydride copolymer can have a weight average molecular weight of in the range of about 1000 to about 900,000; about 20,000 to about 800,000; about 40,000 to about 600,000; about 50,000 to about 500,000; or about 60,000 to about 400,000. In any of the methods or compositions described herein, the 1:1 alternating olefin-maleic anhydride copolymer selected may be a 1:1 alternating copolymer of ethylene and maleic anhydride (1:1 EMA) with a molecular weight of about 60,000 such as that sold under the trademark ZeMac® E-60 (Vertellus Specialties Inc., E60), or the 1:1 EMA selected may have a molecular weight of about 400,000 such as that sold under the trademark ZeMac® E-400 (Vertellus Specialties Inc., E400).

Olefin-maleic anhydride copolymers are typically powders with varying molecular weight that can react with polyamide during the extrusion process acting as chain-extenders.

In any of the processes or compositions described herein comprising an olefin-maleic anhydride copolymers master batch, the master batch comprises one or more additives, a thermally stable high melt flow polymer and a compatible carrier resin. Illustrative polymers for use as carrier resins include, but are not limited to ethylene-ester copolymers (e.g. copolymers of ethylene and n-butyl acrylate, methyl acrylate, or ethyl acrylate, and the like); polyamides, polyamides wherein amine end groups are capped (e.g. with acetyl or other suitable groups), or the end groups are carboxylic acid groups and not amines; polysulfonylamides, where the end groups are not amines; polycarbonates, where the end groups are carboxylic acid groups and not alcohols; and polyesters, where the end groups are carboxylic acid groups and not alcohols; or combinations thereof.

Other additives may also be used in the compositions based on the end use application. Illustrative additives include, but are not limited to, anti-oxidants, nucleating agents, colorants, plasticizers, lubricants, rheology modifiers, friction modifiers, other processing aids, and heat stabilizers for polyamides. As shown in the illustrative examples described herein, an unexpected increase in the mechanical property enhancement in polyamides formulations formed by compounding a polyamide with the olefin-maleic anhydride copolymer master batch and toughener is seen compared to compounding the olefin-maleic anhydride copolymer, the toughener (elastomer), and the polyamide in a single step. Polyamide compositions including olefin-maleic anhydride copolymers but without the impact modifier are described in WO 2012/024268 A1 the disclosure of which is herein incorporated by reference.

It is believed that the compositions described herein increase the impact properties and tensile elongation properties without substantially reducing other mechanical properties such as flexural modulus and tensile strength of the polyamide by chain extension of the polyamide. An illustrative application of the compositions described herein is to upgrade recycled polyamide or nylon. In this context the term "recycled" can include reprocessed, regrind, and reclaimed polyamide as well as "off-spec" polyamide. The compositions described herein can also be used to improve the properties of virgin polyamides.

Injection molding is one of the commonly applied processes for the final conversion of the compositions described herein, it is to be noted that the compositions described herein are useful in other processes such as blow molding, roto-forming, fiber forming, film, profile and sheet extrusion and thermoforming.

Described herein are compositions, comprising a polyamide, an olefin-maleic anhydride copolymer, an elastomeric polymer and optional stabilizers and other additives. Also described herein are compositions, comprising an ethylene-maleic anhydride copolymer and one or more elastomers or tougheners with an optional stabilizers. The stabilizer package includes additives used individually or in combination. Illustrative stabilizers include, but are not limited to, one or more phenolic antioxidants such as N, N'-hexane-1,6-diylbis[3-(3,5-di-tert-butyl-4-hydroxyphenylpropionamide)] (like Irganox® 1098 and BNX1098), phosphites such as tris(2,4-di-tert-butylphenyl)phosphite (like Irgaphos® 168 and Benefos® 1680), cuprous iodide (CuI), and/or potassium iodide (KI). It is appreciated that the person skilled in the art of polymer compounding can choose an appropriate combination of additives or stabilizers for the polyamide, processing conditions, and intended use of the polyamide composition. In one illustrative embodiment, the stabilizer may be present in about 0.01% to about 5.0% w/w of the overall polymer formulation, or about 0.1% to about 2.0% w/w; or about 0.25% to 1.0% w/w in the final composition and in the range of about 1.0% to about 30% w/w or about 5.0 to about 15% w/w in the master batch.

Plasticizers, lubricants, colorants, rheology modifiers, friction modifiers, UV stabilizers, flame retardants, reinforcements, fillers and other additives known to one skilled in the art may be optionally added to the polyamide composition described herein depending on the application requirements.

In one embodiment, the method of producing polymer compositions of polyamides by compounding the polyamide with an elastomeric polymer, and an olefin-maleic anhydride polymer as described herein results in increases in the polyamide's molecular weight and/or favorable structural changes resulting in substantially improved impact strength and stretch performance (known as tensile elongation) in addition to improvement in other properties such as tensile strength, flexural modulus, and heat deflection temperature.

In an illustrative embodiment of the method of producing a compounded polyamide described herein, the method optionally further comprises the step of converting the composition using a method known to one skilled in the art such as injection molding of the compounded polyamide.

Optionally, the polyamide may be combined with the master batch of olefin-maleic anhydride copolymer directly during injection molding.

The compositions describe herein are usually formed into a pellet form, to be used later in other plastic-forming processes such as extrusion, thermoforming, blow molding, and/or injection molding. Use of twin-screw extruders or continuous mixers for preparation of compositions described herein is preferred where the extruder is equipped with feeders equipped to handle low bulk density powder because they give better mixing at lower melt temperatures. Most of these have screws and barrels made up of segments for mixing, conveying, venting, and additive feeding. When the carrier resin is more flexible it may be advantageous to use other plastics compounding equipment such as single-screw extruders, oscillating screw extrusion, continuous mixers, Banbury mixers, and planetary extruders for compounding as well. Processing parameters such as the temperature of each segment or zone, feed rates, residence time and screw design and speed can be modified by the person skilled in the art for each application.

Polyamides are typically condensation copolymers formed by reaction of dicarboxylic acids with diamines or by ring opening of lactams. Various polyamides can be created by adjusting the number of carbons. The nomenclature used herein designates the number of carbon atom in the diamine first and the number of carbons atoms in the diacid second. Therefore, Polyamide-6,6 has six carbons from the diamine, and six carbons from the diacid, and Polyamide-6,12 would have six carbons from the diamine and twelve carbons from the diacid. Polyamide-6 is a homopolymer formed by a ring-opening polymerization (i.e. ring-opening polymerization of caprolactam,). The polyamide may also be nylon-9, nylon-12, nylon-11, nylon 4,6, nylon 6,10, or any of the polyamides listed herein.

In one embodiment, the olefin-maleic anhydride copolymer (e.g. ZeMac) is incorporated during the process of producing the maleic anhydride-grafted impact modifier, which involves adding maleic anhydride monomer and a peroxide catalyst to the unmodified elastomer (for example, to a metallocene ethylene-octene copolymer commonly known as a flexomer or plastomer). It is expected by one skilled in the art that under the typical conditions used to form the maleic anhydride-grafted impact modifier, the olefin-maleic anhydride copolymer is not significantly incorporated covalently into the maleic anhydride-grafted impact modifier. The resulting composition is then compounded with nylon to produce the impact modified compositions.

Several illustrative embodiments of the invention are described by the following clauses:

A polyamide composition produced by a process comprising the step of compounding a mixture comprising a polyamide; one or more elastomers; and an olefin-maleic anhydride copolymer.

A polyamide composition produced by a process comprising the step of compounding a mixture comprising,
(a) a polyamide,
(b) an olefin-maleic anhydride copolymer, and
(c) an impact modifier.

A polyamide composition produced by a process comprising the steps of:
(a) preparing a master batch composition comprising an elastomer impact modifier and an olefin-maleic anhydride copolymer; and
(b) compounding a polyamide with the master batch composition.

The polyamide composition of the preceding clause wherein the impact modifier olefin-maleic anhydride copolymer master batch composition is prepared by a process comprising the steps of:
(a) preparing a mixture of the olefin-maleic anhydride copolymer, maleic anhydride monomer, an elastomer, and a peroxide catalyst; and
(b) forming the impact modifier in the presence of the olefin-maleic anhydride copolymer.

The polyamide composition any one of the preceding clauses wherein the polyamide composition has at least one improved mechanical property compared to a second polyamide composition that includes the impact modifier and does not include the olefin-maleic anhydride copolymer.

The polyamide composition of any one of the preceding clauses wherein the polyamide composition has mechanical properties that match the mechanical properties of a second polyamide composition that includes the impact modifier and does not include the olefin-maleic anhydride copolymer, wherein the level of the impact modifier in the polyamide composition is lower than the level of the impact modifier in the second polyamide composition.

The polyamide composition of any one of the preceding clauses wherein the improved mechanical property is impact strength.

The polyamide composition of any one of the preceding clauses wherein the composition has at least one additional improved mechanical property selected from flex modulus, elongation at break, and tensile strength, compared to the polyamide.

The polyamide composition of any one of the preceding clauses wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.

The polyamide composition of any one of the preceding clauses wherein the polyamide is selected from the group consisting of nylon-6, nylon 6-6, a copolymer of nylon-6 and nylon 6-6, and mixtures thereof.

The polyamide composition of any one of the preceding clauses wherein the polyamide is recycled polyamide.

The polyamide composition of any one of the preceding clauses wherein the olefin is selected from ethylene, propylene, isobutylene, 1-butene, 1-octene, butadiene, styrene, isoprene, 1-hexene, 1-dodecene, dodecene-1, and 1-tetradecene.

The polyamide composition of any one of the preceding clauses wherein the olefin is ethylene.

The polyamide composition of any one of the preceding clauses wherein the olefin-maleic anhydride copolymer is a 1:1 alternating olefin-maleic anhydride copolymer.

The polyamide composition of any one of the preceding clauses wherein the olefin-maleic anhydride copolymer has a weight average molecular weight of in the range of about 1000 to about 900,000.

The polyamide composition of any one of the preceding clauses wherein the olefin-maleic anhydride copolymer has a weight average molecular weight of about 60,000

The polyamide composition of any one of the preceding clauses wherein the copolymer has a weight average molecular weight of about 400,000.

The polyamide composition of any one of the preceding clauses further comprising one or more stabilizing agents The polyamide composition of any one of the preceding clauses wherein each of the one or more stabilizing agents is independently selected from a group consisting of cuprous iodide, potassium iodide, tris (2,4-di-tert-butylphenyl)phosphite, and N,N'-hexane-1,6-diyl-bis(3-(3,5-di-tert-butyl-4-hydroxyphenylpropionamide)).

The polyamide composition of any one of the preceding clauses wherein each of the one or more stabilizing agents independently has a concentration of about 0.01 to about 1.0% w/w.

The polyamide composition of any one of the preceding clauses further comprises a compatibilizer.

The polyamide composition of any one of the preceding clauses wherein the elastomer is a maleic anhydride grafted elastomer.

The polyamide composition of any one of the preceding clauses wherein the impact modifier is selected from a grafted-maleic anhydride elastomer or a grafted-maleic anhydride terpolymer where the level of maleic anhydride is from about 0.5% to about 5%.

The polyamide composition of any one of the preceding clauses wherein the level of maleic anhydride is from about 0.8% to about 2%.

The polyamide composition of any one of the preceding clauses wherein the maleic-anhydride grafted elastomer is selected from the group consisting of a thermoplastic olefin (TPO), a rubber copolymer produced in a reactor from ethylene and propylene (EPR), a rubber terpolymer of ethylene, propylene and diene-modifier (EPDM), and a plastomer of ethylene with an alpha-olefin, each of which is grafted with maleic anhydride.

The polyamide composition of any one of the preceding clauses wherein the maleic-anhydride grafted elastomer is a random terpolymer of ethylene, an acrylic ester and maleic anhydride, where the level of maleic anhydride is from about 1% to about 5%.

The polyamide composition of any one of the preceding clauses wherein the EPDM, is dicyclopentadiene (DCPD), ethylidene norbornene (ENB), or vinyl norbornene (VNB), where the level of the EPDM is from about 1% to about 12%.

The polyamide composition of any one of the preceding clauses wherein the impact modifier is an ethylene-acrylate ester-maleic anhydride terpolymer.

The polyamide composition of any one of the preceding clauses wherein the acrylate ester is a methyl, propyl, or butyl acrylate esters.

The polyamide composition of any one of the preceding clauses further comprising one or more additives selected from a UV stabilizer, a halogenated or non-halogenated flame retardant additive, a reinforcement material, a heat stabilizer, a light stabilizer, a polymerization regulator, a plasticizer, a lubricant, a rheology modifier, a friction modifier, an anti-blocking agent, an antioxidant, an antistatic agent, a UV absorber, a pigment, and a dye.

The polyamide composition of any one of the preceding clauses wherein the reinforcement is a mineral, or a fiber, a fabric, a roving filament, a tube or a yarn, made from glass, carbon, graphite, cellulose, an aromatic high melting polymer.

An article made from the polyamide composition of any one of the preceding clauses.

METHODS AND EXAMPLES

Materials:
Polyamide 6 (grade PA6 NG320HSL) which is recycled quality was obtained from Jamplast Inc. and was used as received. The other Polyamide-6 used were prime (also called virgin Nylon-6) grade from BASF called Ultramid® B3S and Ultramid® B24 NO2. Polyamide-6,6 used was a prime (also called virgin Nylon-66) grade from BASF called Ultramid® A3K. Care was taken to ensure that all grades stayed dry.

A 1:1 ethylene-maleic anhydride alternating copolymer grade ZeMac® E-60 (E-60) from Vertellus Specialties Inc. with a weight average molecular weight (MWw) of 60,000 was used in illustrative examples. A 1:1 ethylene-maleic anhydride alternating copolymer grade ZeMac® E-400 (E-400) from Vertellus Specialties Inc. with a weight average molecular weight (MWw) of 400,000 was also used in other illustrative examples.

Fusabond® N493 (Ethylene-Octene-g-MAh) from DuPont, Royaltuf® 485 (EPDM-g-MAh) from Addivant and Amplify GR216 (a plastomer grafted with maleic anhydride) from The Dow Chemical Co. were used as commercially available impact modifiers.

Royalene® IM7200 pellets from Lion Copolymer, Optema™ grade TC 141, an ethylene-methyl acrylate copolymer resin from ExxonMobil Chemicals with a melt index of 110 g/min and Lotryl® grade 28BA175 an ethylene-butyl acrylate copolymer were used as representatives of the elastomers without maleic anhydride grafting.

Amplify® GR205 (high density polyethylene grafted with maleic anhydride) from The Dow Chemical Co. was used as a representative non-elastomeric graft copolymer, used as a compatibilizer.

Optema® grade TC 141, ethylene-methyl acrylate copolymer resin from ExxonMobil Chemicals with a melt index of 110 g/min and Amplify® GR216 (a plastomer grafted with maleic anhydride) from The Dow Chemical Co. were used as carrier resins for the master batch formulations.

Glass Fiber grade used was ECS 03 T275H from NEG and fed downstream into the melt with a side feeder during compounding.

Testing:
The following TABLE 1 shows the test methods used and the corresponding ASTM methods.

TABLE 1

| Tests | ASTM Method & Conditions |
| --- | --- |
| Tensile Strength, & Elongation | D 638 at room temperature (23° C.) |
| Flexural Modulus & Strength | D 790 at room temperature (23° C.) |
| Notched Izod Impact Strength | D 256 at room temperature (23° C. & −30° C.) |
| Notched Charpy Impact Strength | ISO 179-2/2 at room temperature (23° C. & −30° C.) |
| Heat Deflection Temperature (HDT) | ASTM D648 at room temperature (23° C.) |

Compounding with Elastomeric Polymer, Olefin-Maleic Anhydride and Polyamide

Compounding was carried out using a counter-rotating inter-meshing twin screw extruder (Berstorff 25 mm.) with the temperature profile of 220, 235, 255, 245, 240, 240, 240, and 260° C. cooled in a water bath and pelletized. A two-feeder system was used to feed the hopper for the compounding. The additives (e.g. stabilizer such as antioxidant and heat stabilizers) were pre-mixed with olefin-maleic anhydride copolymers and fed through one feeder while carrier resin and other pellets described herein was fed through the other. The resulting pellets were dried for 12 hours at 70° C. to remove retained moisture. The formulations are shown in the TABLE 2. The virgin nylon-6 used was Ultramid® B3S and the EPDM pellets used were Royalene® IM 7200 both described herein. The high density polyethylene grafted maleic anhydride used showing the optional use of a compatibilizer was Amplify® GR 205 (POE-g-MAh). The stabilizers used and the ethylene-maleic anhydride alternating copolymers used are also described herein.

meshing twin screw extruder (Coperion ZSK-40) with virgin Polyamide-6 using the temperature settings of 230, 240, 240, 240, 240, 250, 250, 250, 250, 250, 245, 240° C. and virgin Polyamide-6,6 with NEG's glass fiber fed through side feeder (Grade ECS 03 T275H) using temperature settings of 243, 254, 262, 268, 274, 281, 280, 276, 271, 274° C. In both these experiments commercially available grafted maleic anhydride copolymers Fusabond® N493 (PE-g-MAh) and Royaltuf® 485 (EPDM-g-MAh) were used.

TABLE 2

| Example # | Virgin Nylon-6 | EPDM Pellets | E-60 | E-400 | POE-g-MAh | Stabilizer Package | | | |
|---|---|---|---|---|---|---|---|---|---|
| | | | | | | CuI | KI | Phosphite Stabilizer | Hindered Phenol AO |
| 1 (control) | 74% | 25% | — | — | — | 0.01% | 0.09% | 0.4% | 0.5% |
| 2 | 72% | 25% | 2.0% | — | — | 0.01% | 0.09% | 0.4% | 0.5% |
| 3 | 72% | 25% | — | 2.0% | — | 0.01% | 0.09% | 0.4% | 0.5% |
| 4 | 72% | 25% | — | — | 2.0% | 0.01% | 0.09% | 0.4% | 0.5% |

TABLE 3

| Example # | ASTM D638 | | | ASTM D 790 | | ASTM D256 | | ISO 179-2/2 | |
|---|---|---|---|---|---|---|---|---|---|
| | | | | | | Izod Impact | Izod Impact | Charpy | Charpy |
| | Tensile Strength @ Yield (MPa) | Tensile Elongation (%) | Tensile Modulus (MPa) | Flexural Modulus (MPa) | Flexural Strength @ Break (MPa) | Strength @ 23° C. (ft-lb/in) | Strength @ −30° C. (ft-lb/in) | Impact Strength @ 23° C. (KJ/m$^2$) | Impact Strength @−30° C. (KJ/m$^2$) |
| 1 (control) | 37.77 | 8.57 | 1492.6 | 1402.8 | 29.96 | 0.82 (CB) | 0.55 (CB) | 6.47 (CB) | 6.31 (CB) |
| 2 | 45.96 | 7.27 | 1703 | 1913.3 | 63.77 | 1.21 (CB) | 0.74 (HB) | 7.16 (CB) | 5.60 (CB) |
| 3 | 46.58 | 10.18 | 1701.8 | 1871.5 | 62.74 | 1.24 (CB) | 0.73 (HB) | 9.54 (CB) | 9.53 (CB) |
| 4 | 37.6 | 29.25 | 1404.2 | 1498.8 | 50.08 | 2.93 (CB) | 1.80 (CB) | 30.70 (NB) | 31.1 (NB) |

CB indicates complete break, HB indicates some of the specimen broke while the others did not and NB indicates no break for the impact strength values.

After compounding and testing, the results obtained are shown in TABLE 3. The data for Example 2, 3 and 4 show improvements in most properties compared to Example 1 (control). Overall impact strength is improved; the improvement is higher for the composition with the compatibilizer, Example 4, and less for the non-compatibilized compositions in Example 2 and 3. Tensile strength for the composition in Example 3 is higher and much more so for that in Example 4. Similarly the flexural strength at break is also higher for the compositions in Examples 2 and 3. The unexpected result is that other properties such as tensile strength and flexural modulus which typically decrease actually improve in spite of the 25% of elastomeric component in the compositions of this invention. The processes and compositions described herein can be extended to using other elastomeric systems such as plastomers and combination of elastomers to boost the mechanical properties in presence of ethylene-maleic anhydride alternating copolymer of the current invention.

Additional compounding examples described in TABLES 4 and 6 were carried out using a counter-rotating inter-

TABLE 4

| Example # | Virgin Nylon-6 | E-60 | PE-g-MAh | EPDM-g-MAh |
|---|---|---|---|---|
| 9 (control) | 85.0% | — | 15% | — |
| 10 | 84.36% | 0.64% | 15% | — |
| 11 (control) | 85.0% | — | — | 15% |
| 12 | 84.36% | 0.64% | — | 15% |

TABLE 5 shows test results for the materials obtained after compounding and injection molding the compositions shown in TABLE 4. Example 9 and 11 are controls whose mechanical properties at both room temperature and low temperature at −30° C. are compared to the properties obtained from Examples 10 and 12 containing E-60. Both Examples 10 and 12 show marked improvement in room temperature impact resistance, in addition to improvements in low temperature impact resistance, tensile strength, elongation and flexural modulus.

TABLE 5

| Example # | ASTM D638 | | ASTM D790 Flexural Modulus (MPa) | ASTM D256 | |
|---|---|---|---|---|---|
| | Tensile Stress @ Yield (MPa) | Tensile Elongation @ Break (%) | | Izod Impact Strength @ 23° C. (ft-lb/in) | Izod Impact Strength @ −30° C. (ft-lb/in) |
| 9 (control) | 54.5 | 9.7 | 1923.6 | 9.51 | 3.05 |
| 10 | 58.9 | 25.7 | 1950.9 | 12.6 | 3.21 |
| 11 (control) | 56.7 | 13.9 | 2053.6 | 12.8 | 2.49 |
| 12 | 56.8 | 28.4 | 2058.9 | 16.6 | 2.95 |

TABLE 6 shows the composition of nylon 6-6 containing 30% glass fibers along with commercial available grafted maleic anhydride copolymers Fusabond® N493 (PE-g-MAh) and Royaltuf® 485 (EPDM-g-MAh) also known as impact modifier along with olefin-maleic anhydride copolymer (E-60).

TABLE 6

| Example # | Virgin Nylon-6,6 | Glass Fibers | E-60 | PE-g-MAh | EPDM-g-MAh |
|---|---|---|---|---|---|
| 13 (control) | 62.5% | 30% | — | 7.5% | — |
| 14 | 62.0% | 30% | 0.5% | 7.5% | — |
| 15 (control) | 62.5% | 30% | — | — | 7.5% |
| 16 | 62.0% | 30% | 0.5% | — | 7.5% |

The Examples 14 and 16 containing E-60 in TABLE 7 are compared to their respective controls without E-60 (Example 13 and 15). It is believed that E-60 is acting as an interfacial agent between nylon, glass fiber and impact modifiers to yield improvements in all the mechanical properties including low temperature impact resistance.

TABLE 7

| Example # | ASTM D638 | | ASTM D790 Flexural Modulus (MPa) | ASTM D256 | |
|---|---|---|---|---|---|
| | Tensile Stress @ Yield (MPa) | Tensile Elongation @ Break (%) | | Izod Impact Strength @ 23° C. (ft-lb/in) | Izod Impact Strength @ −30° C. (ft-lb/in) |
| 13 (control) | 146.0 | 5.13 | 6808.9 | 2.91 | 2.02 |
| 14 | 149.7 | 5.33 | 6667.3 | 3.36 | 2.09 |
| 15 (control) | 149.8 | 4.99 | 6768.3 | 2.93 | 2.06 |
| 16 | 149.8 | 5.09 | 7262.9 | 3.15 | 2.34 |

Preparation of Compositions with Recycled and Virgin Polyamide Using the Master Batch Approach:

Also described herein are compositions prepared using a master batch approach, which typically consists of two steps. In Step 1, the master batch is prepared by combining the olefin-maleic anhydride copolymer with an elastomeric material and in Step 2, the master batch is then "let down" or further compounded into a polyamide. In either of step 1 or 2, additional components may be included in the compositions.

Step 1—General Compounded Master Batch Preparation

In addition to the above, compositions of this invention were prepared using the master batch approach. TABLE 8 shows the composition of each masterbatch (MB) MB-1, MB-2 and MB-3; processing was carried out using a counter-rotating inter-meshing twin screw extruder (Berstorff 25 mm.) with the temperature profile of 140, 150, 155, 155, 155, 155, 155, 170° C. resulting into strands that were cooled in a water bath and pelletized. TABLE 8 also shows composition masterbatch MB-4, compounding of which was carried out in two step process using a counter-rotating inter-meshing twin screw extruder (Berstorff 52 mm.). In each step the ratio of ZeMac® E-60 powder to the amine end-capped Nylon-6 (Ultramid® B24 NO2) was varied to get consistent feeding and avoid any severe reaction with amine end-capped Nylon-6. In both steps, the same temperature profile was used 150, 200, 230, 230, 200, 200, 200, 200, 200, 230° C. and the strands were cooled in a water bath and pelletized. A two-feeder system was used to feed the hopper for the compounding. The additives (e.g. stabilizer, anti-oxidant, optionally lubricant powders) are pre-mixed with olefin-maleic anhydride copolymers and fed through one feeder while carrier resin and other pellets described herein was fed through the other. The resulting pellets were dried for 12 hours at 70° C. to remove retained moisture. The formulations used for producing master batches with olefin-maleic anhydride copolymers are shown in TABLE 8.

TABLE 8

| Materials | MB-1 | MB-2 | MB-3 | MB-4 |
|---|---|---|---|---|
| Optema TC141 | 25.0 | 25.0 | — | — |
| Lotryl 28BA175 | — | — | 45.0 | — |
| Ultramid ® B24 N02 | — | — | — | 75.0 |
| Amplify ® GR216 | — | 50 | — | — |
| ZeMac ® E60 | 25.0 | 10.0 | 25.0 | 25.0 |
| Cuprous iodide (CuI) | 0.20 | 0.20 | 0.20 | — |
| Potassium iodide (KI) | 1.80 | 1.80 | 1.80 | — |
| BNX ® 1098[1] | 2.00 | 2.00 | 2.00 | — |
| Benefos ® 1680[2] | 6.00 | 6.00 | 6.00 | — |
| Acrawax ® C[3] | 5.00 | 5.00 | 20.0 | — |

TABLE 8-continued

| Materials | MB-1 | MB-2 | MB-3 | MB-4 |
|---|---|---|---|---|
| Polybond ® 3200 | 12.50 | — | — | — |
| DOW ® LLDPE DNDB-1077 NT 7 | 22.50 | — | — | — |

*MB = Master batch Materials
[1]N,N'-hexane-1,6-diylbis[3-(3,5-di-tert-butyl-4-hydroxyphenylpropionamide)]
[2]Tris(2,4-di-tert-butylphenyl)phosphite
[3]N,N' Ethylene bis-stearamide Step 2A—Compounding Formulation of Master Batch and Elastomer with Recycled Polyamide-6:

The master batch MB-1 and MB-2 formulations shown in TABLE 8 were further compounded in second step in a counter-rotating inter-meshing twin screw extruder (Coperion ZSK-40) with recycled Polyamide-6 using the temperature settings of 230, 240, 240, 240, 240, 250, 250, 250, 250, 250, 245, 240° C. Both sets of formulations are shown in TABLE 9.

TABLE 9

| Examples | Recycled Nylon-6 | MB1 | MB2 | PE-g-MAh |
|---|---|---|---|---|
| 17 (control) | 100.0% | — | — | — |
| 18 (control) | 90.00% | — | — | 10% |
| 19 | 90.00% | 2.50% | — | 7.5% |
| 20 | 95.00% | — | 5.00% | — |
| 21 | 93.75% | — | 6.25% | — |

Tensile, flexural and Izod impact strength were measured using the methods listed in TABLE 1. The mechanical tests were carried out after drying the compounded pellets for 12 hours at 70° C. to remove retained moisture; the samples were used as molded after conditioning the test specimen as described in the ASTM protocol. Water absorption tests were carried after drying to equilibration to ensure that all the absorbed water is between 0.01%-0.3% dryness levels.

TABLE 10 shows the tensile, flexural and notched Izod impact strength at room temperature for compounded recycled Polyamide-6. In general, the elastomers are known to enhance impact strength but decrease stiffness.

TABLE 10

| | ASTM D638 | | ASTM D790 | ASTM D256 |
|---|---|---|---|---|
| Example # | Tensile Stress @ Yield (MPa) | Tensile Elongation @ Break (%) | Flexural Modulus (MPa) | Izod Impact Strength @ 23° C. (ft-lb/in) |
| 17 (control) | 63.60 | 17.21 | 2640.0 | 1.30 |
| 18 (control) | 55.62 | 12.60 | 1966.7 | 7.73 |
| 19 | 58.70 | 61.59 | 2300.8 | 14.5 |
| 20 | 64.03 | 40.62 | 2366.8 | 2.87 |
| 21 | 62.23 | 45.83 | 2376.3 | 4.30 |

The results shown in TABLE 10 for Example 18 (control), recycled Polyamide-6, compounded with the maleic anhydride-grafted elastomer (Fusabond® N493), shows improved Izod impact strength compared to the composition of control sample shown in Example 17 (control). However, both tensile and flex properties are lower. Even the tensile elongation is lower. Combining the master batch prepared with an elastomer as the carrier resin, such as that in Example 19, results in high impact strength and improved tensile strength, elongation and flexural modulus. Surprisingly, a small amount of master batch, 2.5 weight %, in combination with the elastomer at 7.5 weight % (Example 11) not only produces double the impact strength when compared to using toughener alone at the same overall weight % (Example 19) but produces impact strength comparable to that obtained from a composition containing a good commercial impact modifier at 20-25 weight %.

The results obtained with the formulations in Examples 20 and 21 demonstrate that Izod impact strength is more than double when compared with the Examples 17 (control). Although the impact strength is not as high as when the elastomer is used alone or in combination with the master batch nevertheless overall there is an improvement in tensile strength and impact strength which is still very desirable for many applications.

Step 2B—Compounding Formulation of Master Batch and Elastomer with Virgin Polyamide-6 and Polyamide-6, 6:

The compounded master batch MB-2 and MB-3 shown in TABLE 8 were re-compounded in second step in a counter-rotating inter-meshing twin screw extruder (Coperion ZSK-40) with virgin Polyamide-6 using the temperature settings of 230, 240, 240, 240, 240, 250, 250, 250, 250, 250, 245, 240° C. The formulations are shown in TABLE 11.

TABLE 11

| Example # | Virgin Nylon-6 | MB-2 | MB-3 | PE-g-MAh | EPDM-g-MAh |
|---|---|---|---|---|---|
| 22 (control) | 85.0% | — | — | 15.00% | — |
| 23 | 87.5% | 6.25% | — | 6.25% | — |
| 24 | 85.0% | — | 2.50% | 12.50% | — |
| 25 | 87.0% | — | 2.50% | 10.50% | — |
| 26 (control) | 75.0% | — | — | 25.00% | — |
| 27 | 77.4% | 5.60% | — | 17.00% | — |
| 28 (control) | 85.0% | — | — | — | 15.00% |
| 29 | 87.5% | 6.25% | — | — | 6.25% |
| 30 | 85.0% | — | 2.50% | — | 12.50% |
| 31 | 87.0% | — | 2.50% | — | 10.50% |
| 32 (control) | 75.0% | — | — | — | 25.00% |
| 33 | 77.4% | 5.60% | — | — | 17.00% |

TABLE 12 shows the mechanical properties of control samples (Examples 22, 26, 28 and 32) containing two different commercial impact modifiers used at 15% and 25% levels in virgin Polyamide-6. As a result of masterbatch addition in Examples 23-25, 27, 29-31 and 32 shows moderate increase or retained impact resistance with significant increase in tensile strength, elongation and flexural modulus compared to their respective control samples. The resulting Polyamide-6 would be considered to be superior to commonly known super-tough nylon-6.

TABLE 12

| | ASTM D638 | | ASTM D790 | ASTM D256 |
|---|---|---|---|---|
| Example # | Tensile Stress @ Yield (MPa) | Tensile Elongation @ Break (%) | Flexural Modulus (MPa) | Izod Impact Strength @ 23° C. (ft-lb/in) |
| 22 (control) | 51.3 | 10.2 | 1837.1 | 13.3 |
| 23 | 55.5 | 32.8 | 2008.1 | 14.2 |
| 24 | 56.3 | 43.9 | 2191.9 | 14.3 |
| 25 | 56.1 | 21.7 | 2011.6 | 13.2 |
| 26 (control) | 39.1 | 18.1 | 1468.3 | 13.4 |
| 27 | 49.0 | 69.9 | 1905.1 | 17.7 |
| 28 (control) | 49.6 | 23.5 | 1870.6 | 14.4 |

TABLE 12-continued

| | ASTM D638 | | | |
|---|---|---|---|---|
| Example # | Tensile Stress @ Yield (MPa) | Tensile Elongation @ Break (%) | ASTM D790 Flexural Modulus (MPa) | ASTM D256 Izod Impact Strength @ 23° C. (ft-lb/in) |
| 29 | 60.9 | 21.5 | 2415.7 | 14.8 |
| 30 | 53.0 | 66.7 | 1942.7 | 16.1 |
| 31 | 61.9 | 49.9 | 2384.4 | 15.3 |
| 32 (control) | 38.3 | 35.6 | 1570.9 | 18.4 |
| 33 | 46.8 | 67.7 | 1909.3 | 19.3 |

TABLE 13 shows the composition of virgin Polyamide-6,6 compounded with impact modifier and masterbatches using similar equipment as virgin Polyamide-6, however a different temperature profile of 243, 254, 262, 268, 274, 281, 280, 276, 271, 274° C. was used.

TABLE 13

| Example # | Virgin Nylon-6,6 | MB-2 | MB-3 | MB-4 | PE-g-MAh | EPDM-g-MAh |
|---|---|---|---|---|---|---|
| 34 (control) | 85.0% | — | — | — | 15.0% | — |
| 35 | 87.5% | 6.00% | — | — | 6.5% | — |
| 36 | 85.0% | — | 2.40% | — | 12.5% | — |
| 37 | 85.0% | — | — | 2.40% | 12.5% | — |
| 38 (control) | 85.0% | — | — | — | — | 15.0% |
| 39 | 87.5% | 6.00% | — | — | — | 6.5% |
| 40 | 85.1% | — | 2.40% | — | — | 12.5% |
| 41 | 87.1% | — | 2.40% | — | — | 10.5% |
| 42 (control) | 75.0% | — | — | — | — | 25.0% |
| 43 | 75.0% | — | 2.00% | — | — | 23.0% |

TABLE 14 shows the mechanical properties of compounded compositions of TABLE 13. The virgin Polyamide-6,6 in the presence of masterbatch of olefin-maleic anhydride copolymer shows very similar trend of impact resistance improvement and other mechanical property enhancements as obtained in virgin Polyamide-6 (TABLE 12). Only exception is Example 35, where the impact resistance slightly goes down compared to its control (Example 34); however other mechanical properties are significantly improved. In other examples, compared to controls samples (Example 34 & 38), Examples 36 and 40 shows highly pronounced impact resistance enhancements in the presence of MB-3 when used in combination of either type of impact modifiers (Fusabond and Royaltuf).

TABLE 14

| | ASTM D638 | | | |
|---|---|---|---|---|
| Example # | Tensile Stress @ Yield (MPa) | Tensile Elongation @ Break (%) | ASTM D790 Flexural Modulus (MPa) | ASTM D256 Izod Impact Strength @ 23° C. (ft-lb/in) |
| 34 (control) | 53.0 | 19.1 | 1945.2 | 11.3 |
| 35 | 62.2 | 27.5 | 2186.8 | 11.4 |
| 36 | 58.9 | 28.2 | 2145.3 | 14.8 |
| 37 | 60.3 | 23.7 | 2147.5 | 12.6 |
| 38 (control) | 53.2 | 29.2 | 2069.0 | 12.5 |
| 39 | 64.7 | 26.1 | 2278.3 | 11.0 |
| 40 | 58.7 | 31.0 | 2111.1 | 15.6 |
| 41 | 61.7 | 27.9 | 2188.8 | 12.5 |
| 42 (control) | 39.4 | 53.2 | 1469.0 | 19.1 |
| 43 | 44.9 | 42.2 | 1583.4 | 19.4 |

As can be seen for control Examples 44, 49 and 52, shown in TABLE 15, the presence of an elastomer or an impact modifier generally results in a lower heat deflection/heat distortion temperature (HDT). The processes and compositions described herein surprisingly enhance the HDT even of virgin Nylons that are compounded with an elastomer or an impact modifier. TABLE 15 shows the composition and effect of ZeMac® E-60 and its masterbatches on HDT of virgin Nylon-6 and Nylon-66 in the presence of elastomer or an impact modifier.

TABLE 15

| Example # | Virgin Nylon-6 | Virgin Nylon-6,6 | PE-g-MAh | EPDM-g-MAh | E-60 | MB-2 | MB-3 | MB-4 | ASTM D648 HDT @ 66 psi (° C.) |
|---|---|---|---|---|---|---|---|---|---|
| 44 (control) | 85.00% | — | 15.0% | — | — | — | — | — | 148.8 |
| 45 | 86.87% | — | 12.5% | — | 0.625% | — | — | — | 157.8 |
| 46 | 87.50% | — | 6.25% | — | — | 6.25% | — | — | 153.3 |
| 47 | 85.10% | — | 12.5% | — | — | — | — | 2.4% | 153.3 |
| 48 | 87.10% | — | 10.5% | — | — | — | — | 2.4% | 155.3 |
| 49 (control) | 85.00% | — | — | 15.0% | — | — | — | — | 145.9 |
| 50 | 86.87% | — | — | 12.5% | 0.625% | — | — | — | 161.9 |
| 51 | 87.10% | — | — | 10.5% | — | — | — | 2.4% | 157.7 |
| 52 (control) | — | 85.00% | 15.0% | — | — | — | — | — | 187.6 |
| 53 | — | 86.90% | 12.5% | — | 0.60% | — | — | — | 203.4 |
| 54 | — | 87.25% | 6.25% | — | — | 6.50% | — | — | 214.0 |
| 55 | — | 85.10% | 12.5% | — | — | — | 2.4% | — | 213.7 |
| 56 | — | 85.10% | 12.5% | — | — | — | — | 2.4% | 206.9 |

Examples 45-48, 50-51 and 53-56 in TABLE 15 show enhanced HDT values when compared to their respective control samples. Some of the compositions shown in TABLE 15 are similar to those shown in TABLES 11 and 13 except examples 45, 48, 50, 51, 53 and 56. The Examples in TABLE 15 which are similar to TABLES 11 and 13 containing masterbatches and impact modifiers not only show higher values of impact resistance but also show enhanced mechanical and thermal properties.

Preparation of Articles with Composition

The compositions of the present invention herein may be formed into articles using methods known to those skilled in the art. Illustrative examples include injection molding, blow molding, extrusion, and the like. The Polyamide-6 compositions of TABLE 11 were injection molded into various shapes such as dog bone and plaque. The molding was carried out using the following equipment and process conditions:

i. Vandorn Intelect 110T injection molding press equipped with a standard single screw having diameter of 35 mm, an L/D ratio equal 20/1;
ii. a barrel temperature between 225-250° C. with increasing profile;
iii. a nozzle temperature of 238° C.;
iv. a mold temperature of 83° C.;
v. a mold for ASTM D638 Type I for tensile bars;
vi. a mold with plaque dimension of 4.25 in×4.25 in×0.125 in;
vii. a screw rotation speed of 100 RPM;
viii. injection at speed 1-1.5 in/sec;
ix. a specific injection pressure of 2300 psi and hold pressure of 800 psi;
x. a hold time of 8-10 sec.

While several illustrative embodiments of methods for production of polyamide compositions with high values of impact resistance, mechanical properties, thermal properties and methods for use of the compositions into articles have been described herein, the embodiments are merely offered by way of non-limiting examples of the invention described herein. Many variations and modifications of the embodiments described herein will be apparent in light of the disclosure. It is therefore to be understood that changes and modifications may be made by one of skill in the art, and equivalents may be substituted for elements thereof, without departing from the scope of the invention.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. It will be appreciated that other sequences of steps may be possible. Therefore, the particular order of the steps disclosed herein should not be construed as limitations on the claims. In addition, the claims directed to a method and/or process should not be limited to the performance of their steps in the order written, and it will be readily appreciated that the sequences may be varied and still remain within the spirit and scope of the present invention.

What is claimed is:

1. A polyamide formulation comprising
a polyamide,
a 1:1 alternating olefin-maleic anhydride copolymer, wherein the olefin is ethylene, and
an impact modifier,
wherein the impact modifier is an acrylic-core shell impact modifier, a polymer or copolymer with maleic anhydride or isocyanate pendant groups, an ethylene-acrylate ester-maleic anhydride terpolymer, an ethylene-acrylate ester copolymer, a thermoplastic olefin, or a thermoplastic elastomer, and
wherein the olefin-maleic anhydride copolymer increases the heat deflection temperature (HDT) by an amount in the range of 4.5° C. to 26.4° C. as measured by ASTM D648 at 66 psi.

2. The polyamide formulation of claim 1, wherein the formulation does not include glass fibers.

3. The polyamide formulation of claim 1, wherein the acrylate ester is a methyl, propyl, or butyl acrylate ester.

4. The polyamide composition of claim 1, wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.

5. The polyamide composition of claim 1, wherein the polyamide is selected from the group consisting of nylon-6, nylon 6-6, a copolymer of nylon-6 and nylon 6 6, and mixtures thereof.

6. The polyamide composition of claim 1, wherein the olefin-maleic anhydride copolymer has a weight average molecular weight of about 20,000 to about 800,000.

7. The polyamide composition of claim 1, wherein the impact modifier is a grafted-maleic anhydride elastomer or a grafted-maleic anhydride terpolymer having a maleic anhydride content of from about 0.5% to about 5%.

8. An article comprising a polyamide composition according to claim 1.

9. The polyamide composition of claim 1, wherein the olefin-maleic anhydride copolymer increases the Izod Impact Strength by an amount in the range of 0.39 ft-lb/in to 2.1 ft-lb/in at 23° C. as measured by ASTM D256.

10. The polyamide composition of claim 1, wherein the Izod Impact Strength is 1.21 ft-lb/in to 2.93 ft-lb/in at 23° C. as measured by ASTM D256.

11. The polyamide composition of claim 1, wherein the olefin-maleic anhydride copolymer increases the Flexural Modulus by an amount in the range of 72 MPA to 510.5 MPA as measured by ASTM D790.

12. The polyamide composition of claim 1, wherein Flexural Modulus is 1498 MPA to 1913.3 MPa as measured by ASTM D 790.

13. A polyamide composition produced by a process comprising the steps of:
(a) preparing a master batch composition comprising an impact modifier and a 1:1 alternating olefin-maleic anhydride copolymer, wherein the olefin is ethylene; and
(b) compounding a polyamide with the master batch composition,
wherein the impact modifier is an acrylic-core shell impact modifier, a polymer or copolymer with maleic anhydride or isocyanate pendant groups, an ethylene-acrylate ester-maleic anhydride terpolymer, an ethylene-acrylate ester copolymer, a thermoplastic olefin, or a thermoplastic elastomer, and
wherein the olefin-maleic anhydride copolymer increases the heat deflection temperature (HDT) by an amount in the range of 4.5° C. to 26.4° C. as measured by ASTM D648 at 66 psi.

14. The polyamide composition of claim 13, wherein the composition does not include glass fiber.

15. The polyamide composition of claim 13, wherein the master batch further comprises one or more stabilizing agents.

16. The polyamide composition of claim 15, wherein the one or more stabilizing agents is selected from the group consisting of cuprous iodide, potassium iodide, tris (2,4-di-tert-butylphenyl)phosphite, and N,N'-hexane-1,6-diylbis(3-(3,5-di-tert-butyl-4-hydroxyphenylpropionamide)).

17. The polyamide composition of claim 13, wherein the master batch further comprises one or more compatibilizers selected from the group consisting of acrylic acid modified polypropylene homopolymer, maleic anhydride modified polypropylene homopolymer, ethylene acrylic acid copolymer, and ethylene-octene copolymer grafted with maleic anhydride.

18. A polyamide composition produced by a process comprising the steps of:
(a) preparing a master batch composition comprising an impact modifier and a 1:1 alternating olefin-maleic anhydride copolymer, wherein the olefin is selected from the group consisting of ethylene, propylene, isobutylene, 1-butene, 1-octene, butadiene, isoprene, 1-hexene, 1-dodecene, and 1-tetradecene; and
(b) compounding a polyamide with the master batch composition,
wherein the impact modifier is an acrylic-core shell impact modifier, a polymer or copolymer with maleic anhydride or isocyanate pendant groups, an ethylene-acrylate ester-maleic anhydride terpolymer, an ethylene-acrylate ester copolymer, a thermoplastic olefin, or a thermoplastic elastomer, wherein the master batch further comprises one or more compatibilizers selected from the group consisting of acrylic acid modified polypropylene homopolymer, maleic anhydride modified polypropylene homopolymer, ethylene acrylic acid copolymer, and ethylene-octene copolymer grafted with maleic anhydride.

19. The polyamide composition of claim 18, wherein the composition does not include glass fiber.

20. The polyamide composition of claim 18, wherein the polyamide is selected from the group consisting of nylon-6, nylon 6-6, a copolymer of nylon-6 and nylon 6-6, nylon-9, nylon-10, nylon-11, nylon-12, nylon 6-10, aromatic polyamides, elastomeric polyamides, and mixtures thereof.

* * * * *